United States Patent [19]

Ngo

[11] Patent Number: 4,513,281
[45] Date of Patent: Apr. 23, 1985

[54] AC PLASMA PANEL SHIFT WITH INTENSITY CONTROL

[75] Inventor: Peter D. T. Ngo, Colts Neck, N.J.

[73] Assignee: AT&T Bell Laboratories, Murray Hill, N.J.

[21] Appl. No.: 365,460

[22] Filed: Apr. 5, 1982

[51] Int. Cl.³ .............................................. G09G 3/28
[52] U.S. Cl. ................................. 340/703; 340/769; 340/772
[58] Field of Search ............. 340/768, 769, 772, 773, 340/701–704, 713, 714, 781

[56] References Cited

U.S. PATENT DOCUMENTS

| 3,562,737 | 2/1971 | Wiederhorn et al. | 340/772 |
|---|---|---|---|
| 3,594,610 | 7/1971 | Evans et al. | 340/713 |
| 3,683,364 | 8/1972 | Holz et al. | 340/769 |
| 3,749,969 | 7/1973 | Miyashiro et al. | 340/769 |
| 3,916,393 | 10/1975 | Criscimagna et al. | 340/703 |
| 3,952,230 | 4/1976 | Sakai | 340/768 |
| 4,063,231 | 12/1977 | Mayer et al. | 340/772 |
| 4,112,332 | 9/1978 | Veith et al. | 340/772 |
| 4,162,427 | 7/1979 | Kamegaya et al. | 340/772 |
| 4,328,489 | 5/1982 | Ngo | 340/768 |
| 4,386,348 | 5/1983 | Holz et al. | 340/769 |
| 4,458,244 | 7/1984 | Yamaguchi et al. | 340/769 |

Primary Examiner—Marshall M. Curtis
Attorney, Agent, or Firm—David H. Tannenbaum

[57] ABSTRACT

There is disclosed an ac plasma panel having gray tone and color control. The plasma panel is constructed using a matrix of discharge sites, each site associated with one or more migration sites. The migration sites, in turn, have phosphor areas in conjunction with an electrical field controlling conductor. During the ionization of the plasma gas a selective electrical field is established between a discharge site and an adjacent migration site and the electrons from the gas ionization are free to migrate to the phosphor area of the screen in accordance with the magnitude of the electrical signals on the control conductor.

10 Claims, 19 Drawing Figures

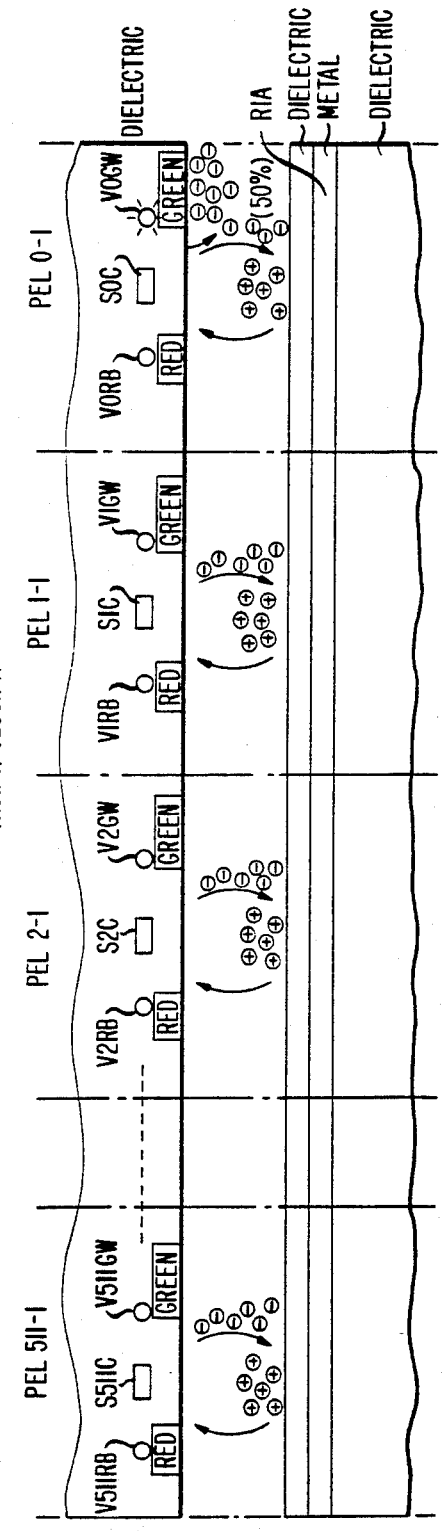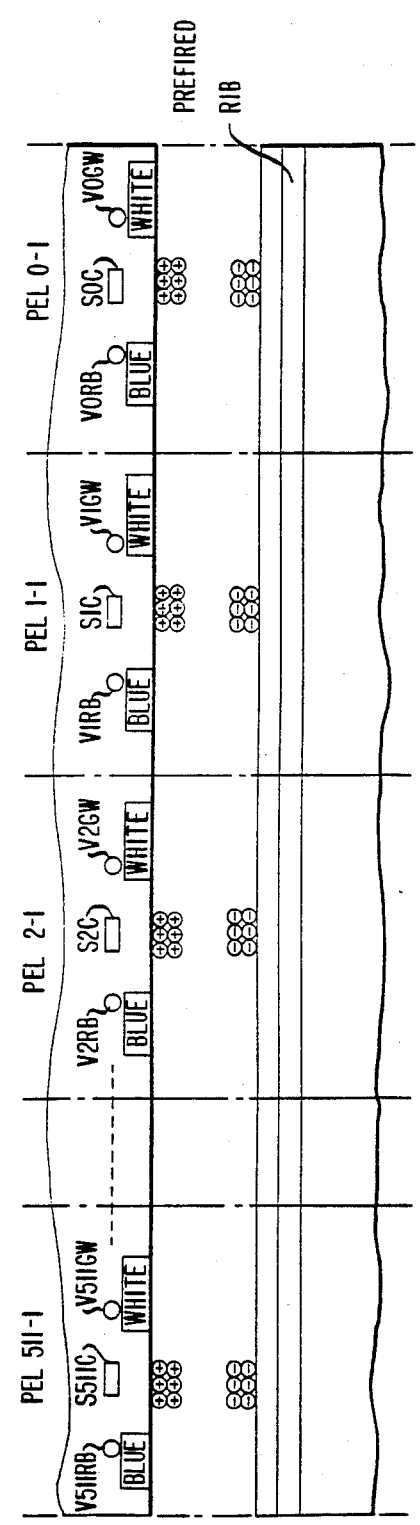

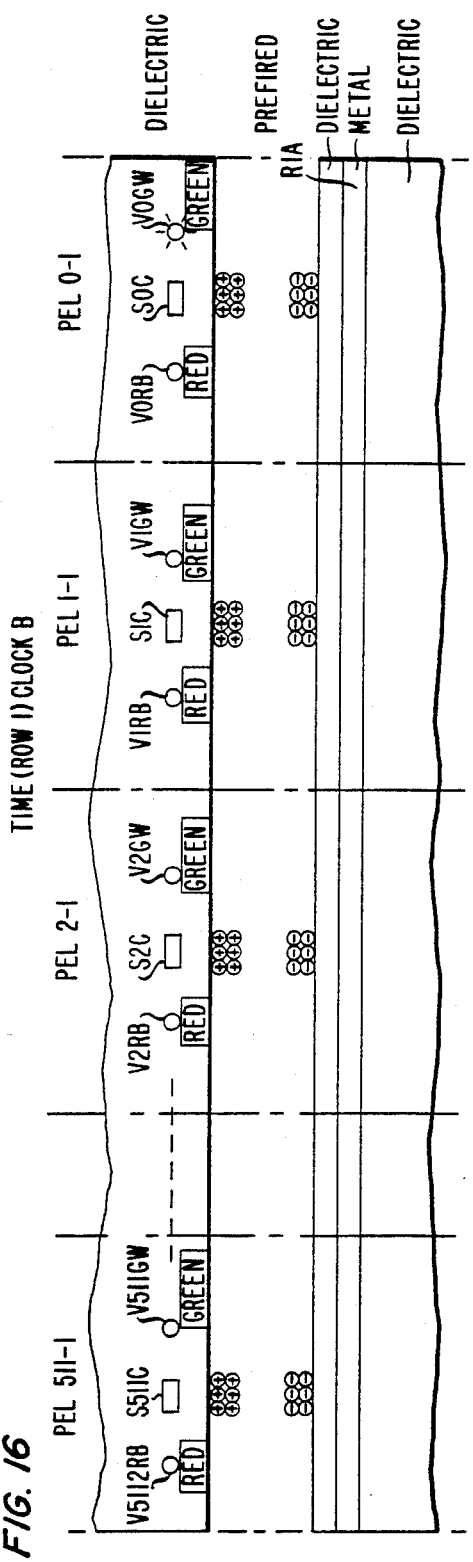
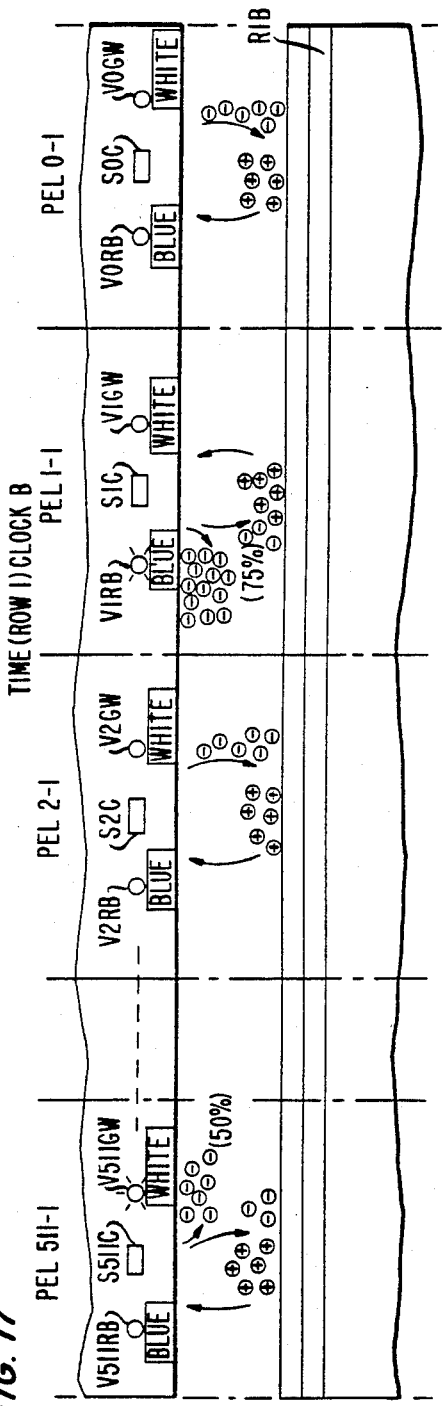
FIG. 16
FIG. 17

AC PLASMA PANEL SHIFT WITH INTENSITY CONTROL

BACKGROUND OF THE INVENTION

My invention relates to a technique for providing gray tones and color on an ac plasma panel.

A plasma panel is a display device comprised of a body of an ionizable gas sealed within a nonconductive transparent envelope. Images on the device are displayed by controllably initiating glow discharges at selected locations within the displayed gas. This is accomplished by setting up electric fields within the gas via appropriately arranged electrodes or conductors.

The invention relates to so-called twin substrate panels where the electrodes are imbedded within dielectric layers disposed on two opposing nonconductive surfaces, such as glass plates. Typically, the conductors are arranged in rows on one plate and columns orthogonal thereto on the other plate. The overlapping, or crosspoints, of the row or column conductors define a matrix of discharge cells or sites. Glow discharges are initiated at selected crosspoints by application of a particular voltage pulse. At any site, the continual reversal of voltage polarity will result in a sustained discharge at that site.

The voltage across the site creates a space charge cloud of electrons and positive ions in the region of the site. In a typical ac plasma panel, concomitant avalanche multiplication, as a result of the applied voltage, creates a glow discharge and an accompanying short (i.e., one microsecond) light pulse in the visible spectrum. The control of an ac plasma panel is, for example, shown in my copending patent applications, Ser. Nos. 109,859, filed Jan. 7, 1980, and 307,169, field Sept. 30, 1981, and which are hereby incorporated by reference.

One major problem with ac plasma panels is their relative inability to provide light intensity control at a discharge site and an inability to provide a full color display. Thus, problems arise from the on-off nature of plasma panels where the monochromatic color of the display is dependent upon the type of gas being ionized with the intensity of the emitted light also being a function of that gas. Thus, while ac plasma panels find widespread acceptance for graphic displays, they have not been found to be acceptable for applications, such as for example, television, where a high degree of contrast is necessary or where color presentation is desirable.

SUMMARY OF THE INVENTION

I have devised an ac plasma panel which will provide both intensity control and, if desirable, color. I have advanced the concept taught in my aforementioned patent application (Ser. No. 109,859), whereby electrons from a charge cloud discharged at a particular site are available for migration to an adjacent site by the creation of an electric field between the discharge site and the migration site.

Taking advantage of this concept, I have arranged an ac plasma panel with a plurality of discharge sites, each such site having adjacent thereto one or more migration sites. The migration sites have deposited on one surface of the panel a particular phosphor, such that when electrons strike the phosphor, light of a particular color is emitted to a viewer. By controlling the electron flow from each discharge site, it is possible to direct the electrons from that site to specific adjacent phosphor migration sites. This electron flow is controlled by the establishment of a variable intensity electric field between the discharge site and the adjacent migration site. The intensity of the electric field is controlled by the unipolar voltage potential between the discharge and migration sites and thus as the voltage potential increases, more electrons flow toward the migration site causing a brighter phosphor discharge.

By masking the actual original light discharge at the glow discharge site, a viewer will only observe the light emitted from the adjacent phosphor sites in accordance with the applied electron field at that site. If the discharge site is surrounded by colored phosphors, each having an associated electric field producing mechanism, it is possible to selectively direct electrons from the host discharge site to selected colored phosphor sites.

In one embodiment I have arranged an ac plasma panel having a matrix of picture elements (pels) each pel having at least one glow discharge site surrounded by colored phosphor migration sites. Each row of pels corresponds to a similar row on a conventional television screen with the migration sites of each pel being driven from the intensity signals corresponding to that pel. Because the electrons for each pel are generated within the site spacing of each surrounding phosphorous site, focusing problems are greatly reduced and the entire screen will have a thickness of approximately 0.5 inches.

BRIEF DESCRIPTION OF THE DRAWING

In the drawing:

FIGS. 8-17 depict cross-sectional representations showing electron and ion movement in the display system of FIG. 1.

DETAILED DESCRIPTION

General

The following discussion of the characteristics and operation of an ac plasma panel will be helpful in understanding the basic principles of ac plasma panel operation. A more detailed discussion will be found in my aforementioned applications, Ser. Nos. 109,859 and 307,169.

A conventional write pulse is impressed across (applied to) a selected discharge site of an ac plasma panel via the row and column conductor pair associated with that site. The magnitude of the pulse exceeds the breakdown voltage of the display gas and is thus sufficient to create an initial glow discharge in the gas in the immediate vicinity of the selected site. The glow discharge is characterized by (a) a short, e.g., one microsecond, light pulse in the visible spectrum, and (b) the creation of a plasma, or "space charge cloud," of electrons and positive ions in the vicinity of the site. The pulse pulls at least some of these so-called charge carriers to opposite walls of the discharge site, i.e., respective regions of the opposing dielectric surfaces near the crosspoint. Even when the pulse terminates, a "wall" voltage remains stored across the gas in the crosspoint region. This wall voltage plays an important role in the subsequent operation of the panel, as will be seen shortly.

Figure 1:
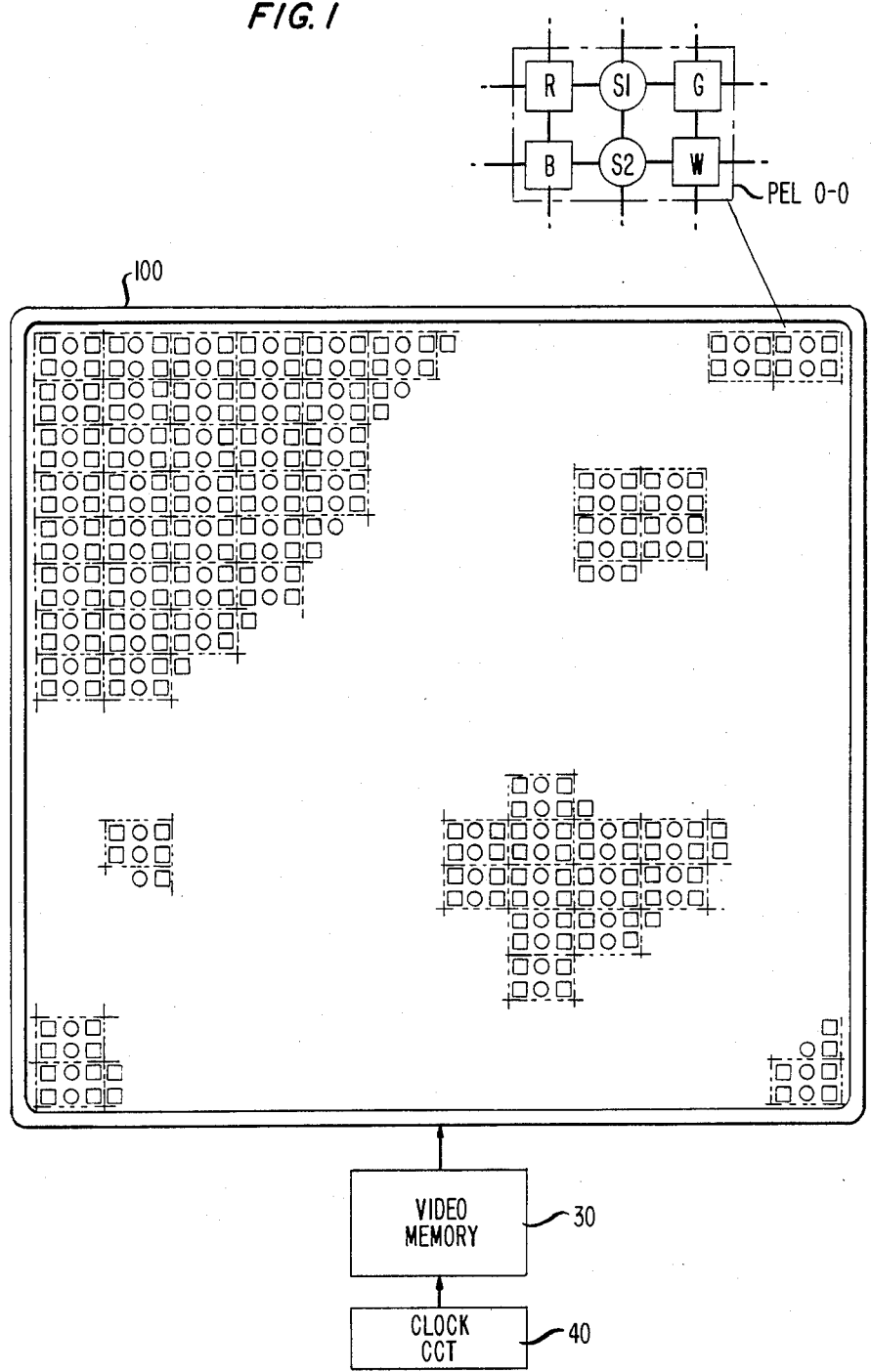
FIG. 1 depicts an ac plasma panel display system having color phosphors arranged into pels.

At the heart of the display system of FIG. 1 is a twin-substrate ac plasma panel 100. As shown in FIG. 1, panel 100 consists of a matrix of picture elements, or pels, of which pel 0-0 is representative. Each pel is constructed such that the glow discharges from sites S1 and S2 are masked so as to be invisible to a viewer. These sites, called the discharge sites, are continually refreshed by recurring alternate polarity voltage pulses.

Colored phosphors, for example red, green, blue and white, are positioned in close proximity to the intersection of the adjacent column and row conductors of each discharge site. For purposes of discussion, these phosphor locations will be called migration sites. Near each such migration site a dc electrode is positioned to attract electrons from the discharge site. Thus, when electrons are caused to migrate from a discharge site, such as from site S1, to one or more dc conductors, the phosphors near the conductors give off light rays visible to a viewer.

When the electronic signals from a standard video memory 30 are applied to the dc conductors (no dielectric coating) of each pel of screen 100 under control of clock 40, the resulting dc voltages cause color signals to be produced at each pel, with the intensity dependent upon the magnitude of the applied dc voltage at each pel.

Of course, when only single colored phosphors are used, the adjacent dc potential serves to move the electrons from the discharge site to the migration site with the number of migrating electrons being dependent upon the magnitude of the attracting voltage. In this manner, intensity is controllable.

Panel 100 is illustratively comprised of two glass plates between which an ionizable gas mixture is sealed. The inner surface of each glass plate is covered by a dielectric layer. Each pel, such as pel 0-0, consists of the intersection of three column conductors and two row conductors. The conductors which intersect at discharge sites S1 and S2 have impressed upon them alternating voltage potentials causing glow (space cloud) discharges thereat. The adjacent column conductors have impressed on them a selected positive voltage pulse of variable magnitude. These voltage pulses serve, as will be discussed, to attract the electrons from the space cloud discharges at sites S1 and S2. Panel 100 is illustratively of the general type disclosed in U.S. Pat. No. 3,823,394 issued July 9, 1974, to B. W. Byrum et al, which is hereby incorporated by reference. The dielectric is removed at each of the migration sites to allow the dissipation of the electrons by allowing the electrons to strike the phosphor at the associated dc column conductor.

Figure 2:
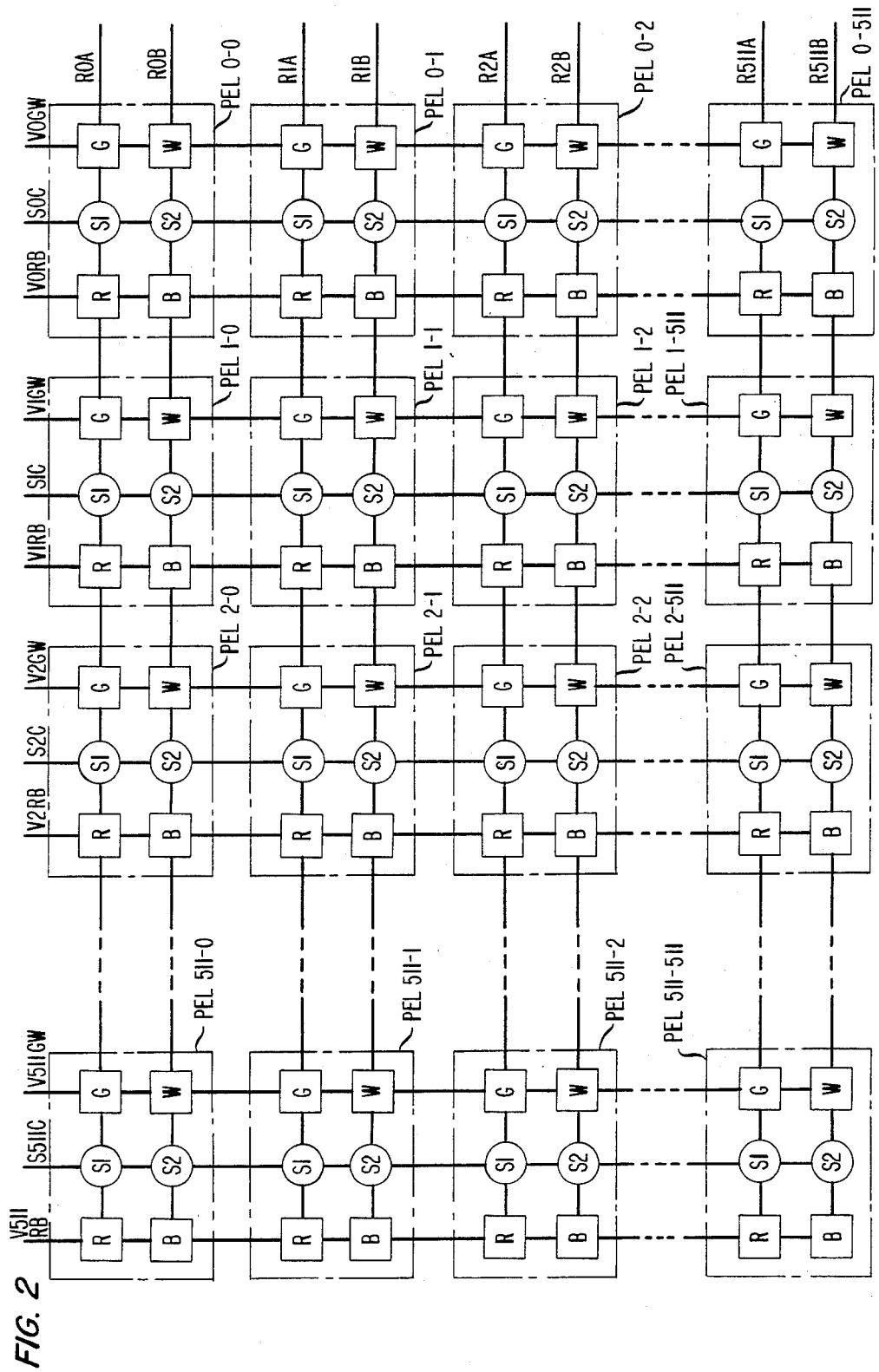
FIG. 2 depicts a schematic representation of the display system, further defining the layout of the pels.

FIG. 2 is an expanded version of panel 100 showing 511 pels in both the horizontal and vertical directions. Each pel contains two discharge site crosspoints S1 and S2 for generating charge clouds. Each pel also contains four areas having colored phosphor. Each phosphor area is located at the crosspoint of a horizontal and vertical conductor. Thus, green phosphor G of pel 00 is located at the intersection of column conductor V0GW and row conductor R0A, while blue phosphor B of pel 00 is located at the intersection of column conductor V0RB and row conductor R0B.

For each pel of the embodiment shown there are two phases of the clock pulse which control the color selection at that pel. For convenience, we will consider these to be phase A and phase B. During phase A of row 0, a charge cloud is generated via the proper voltage signal on row conductor R0A in conjunction with each of the column conductors S0C through S511C. Accordingly, an electron charge cloud, as will be shown in more detail hereinafter, is generated at each of the S1 positions of panel 100 associated with row conductor R0A.

As priorly discussed, the panel is masked at each of the S1 positions, and thus a viewer does not observe any of the five hundred eleven S-site gas discharges of row R0A. Concurrent with the electron cloud generation at each of the S1 positions of row R0A, it is possible, by providing the proper voltage potential on the adjacent column electrodes to direct a portion of the electron cloud to either the red or green associated phosphors, or to both phosphors, or to none of the phosphors, if desired.

As will be discussed, when the electron cloud is being controlled in row R0A, an early (blocking) voltage pulse is applied to all the other rows R0B through R511B so that the electrons from the other discharge sites of panel 100 are not available for migration to their associated column electrodes. In this manner it is possible to individually control each row of the ac plasma panel.

Figure 6:
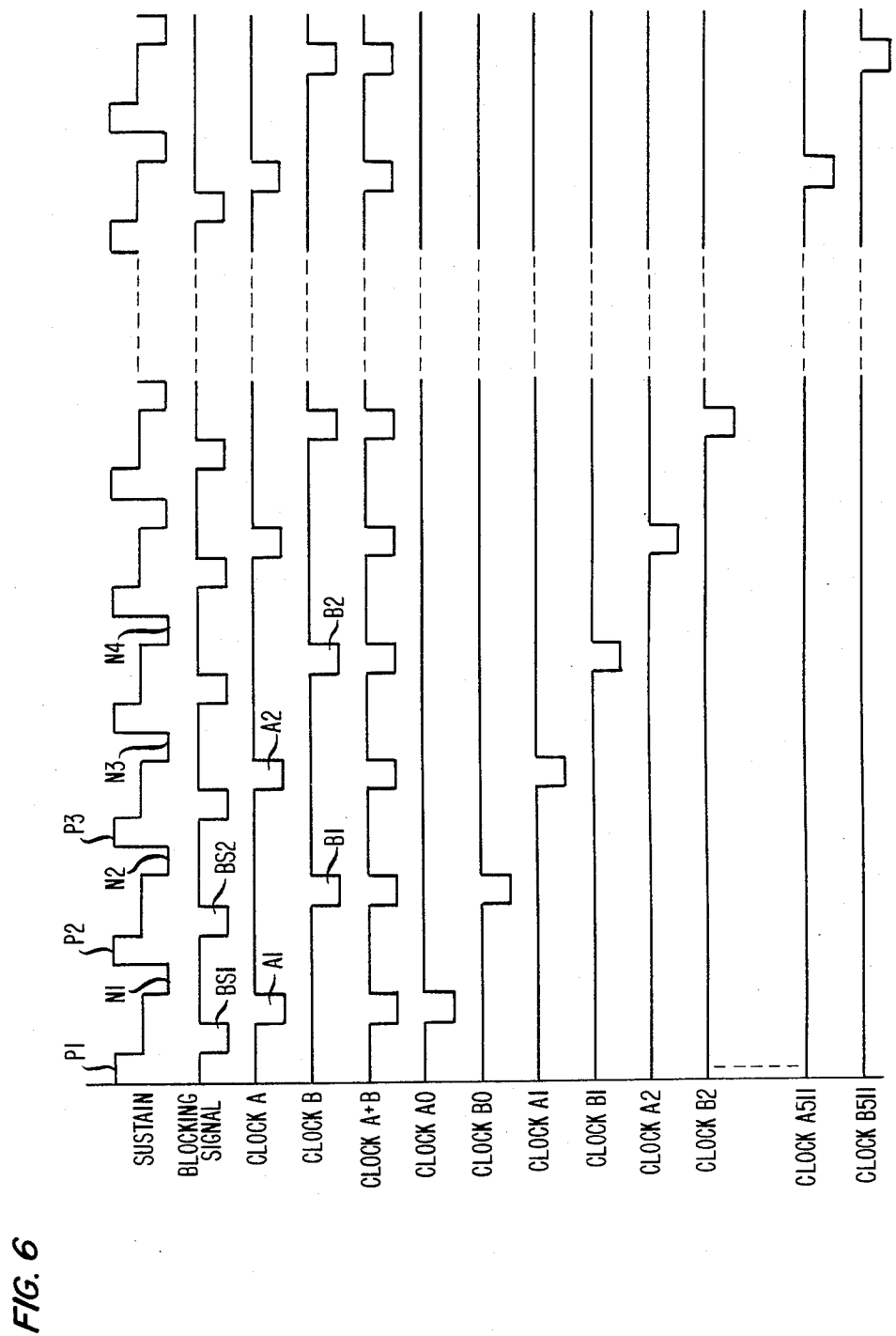
FIGS. 6 and 7 show the clock pulses and timing sequence for the display system.

In FIG. 6, it will be seen that the sustain pulse which is applied to all of the discharge sites via the row conductors R0A through R511B consists of a positive going 5 microsecond pulse P1 followed by a 5 microsecond quiescent stage, followed by a 5 microsecond negative pulse N1. This cycle is continuously repeated. As will be seen hereinafter, the charge cloud migration occurs, if at all, just prior to the negative going pulses of the sustain voltage under control of a negative voltage pulse on the S-column resulting in a net cell voltage similar to the negative sustain voltage. This pulse is called the excitation pulse.

The prefiring, or blocking, signal is applied to those row conductors where migration is not desired. This blocking signal pulse, shown as pulse BS1, is a 5 microsecond negative going pulse which occurs during the quiescent period just before each negative sustain voltage pulse. As will be seen, this pulse has the effect of causing early electron movement at the discharge sites thereby rendering the electrons unavailable for subsequent migration. Thus, in those rows where a prefiring, or blocking pulse occurs, electron migration from the discharge site to the phosphor site does not occur.

Clock A of FIG. 6 provides voltage pulses just prior to the negative odd cycles of the sustain voltage, while clock B provides negative pulses just prior to the even negative voltage pulses of the sustain voltage. In the embodiment shown, each pel of FIG. 2 will require two such pulses—one during the A cycle and one during the B cycle—to completely control that pel. These are referred to as the phase A and phase B pulses.

Control Generation

Figure 5:
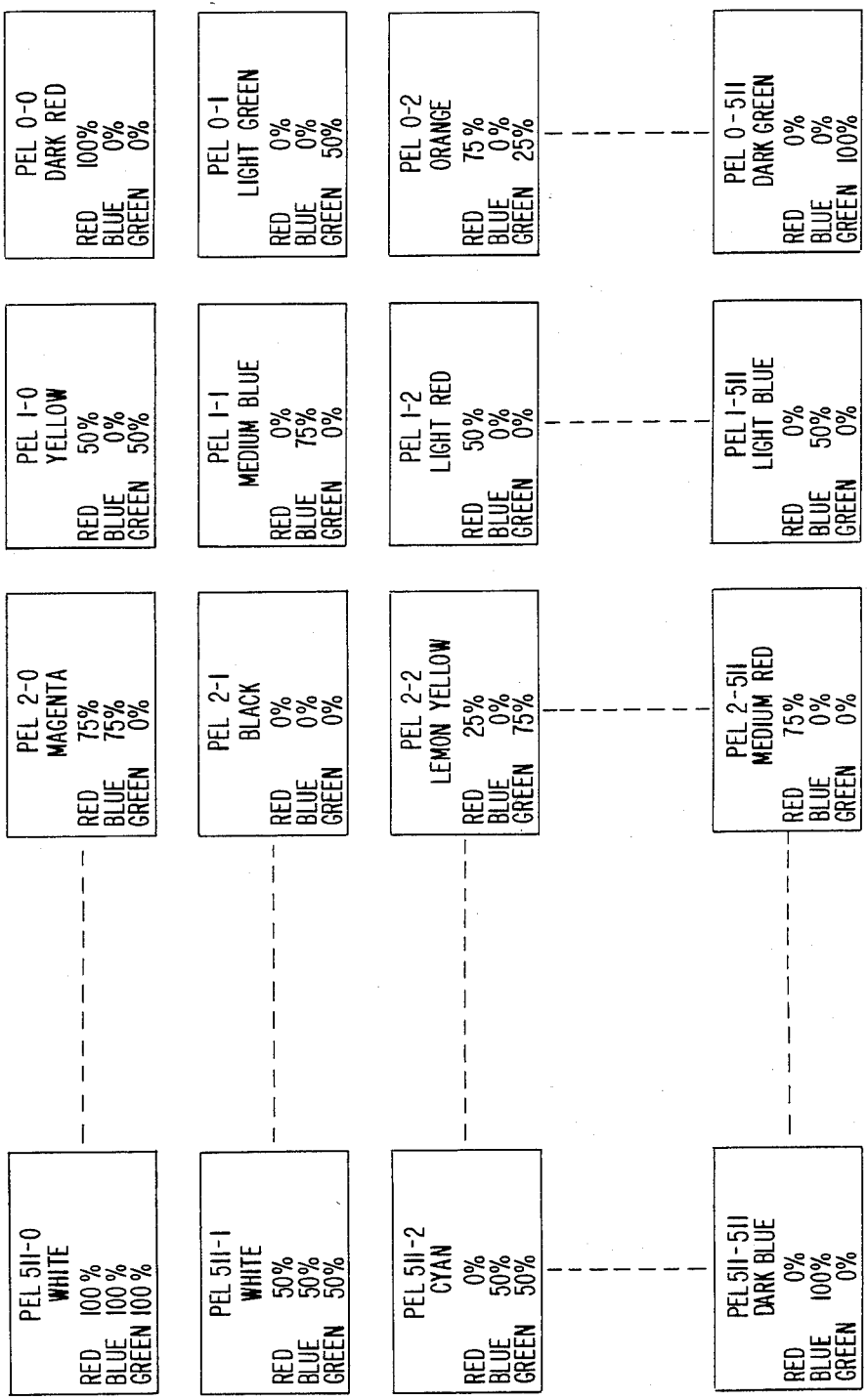
FIG. 5 depicts a set of display system pels having assumed color reception at each pel.

Turning now to FIG. 2, assume that it is desired to establish various colors on panel 100 in accordance with the color layout shown in FIG. 5. These colors are the colors provided from a television camera and received at a color television receiver as a series of signals representing, for each pel, a color signal and an intensity signal. In the embodiment, the color signals for each refresh of the screen are stored in a memory map. The memory locations contain an indication of the color signal for the associated pel plus an indication of the relative strength of that color. As is well known, the true color is a mixture of primary colors mixed by the eye of the viewer. The exact details of how this occurs is not a part of this invention and is well known.

Figure 3:
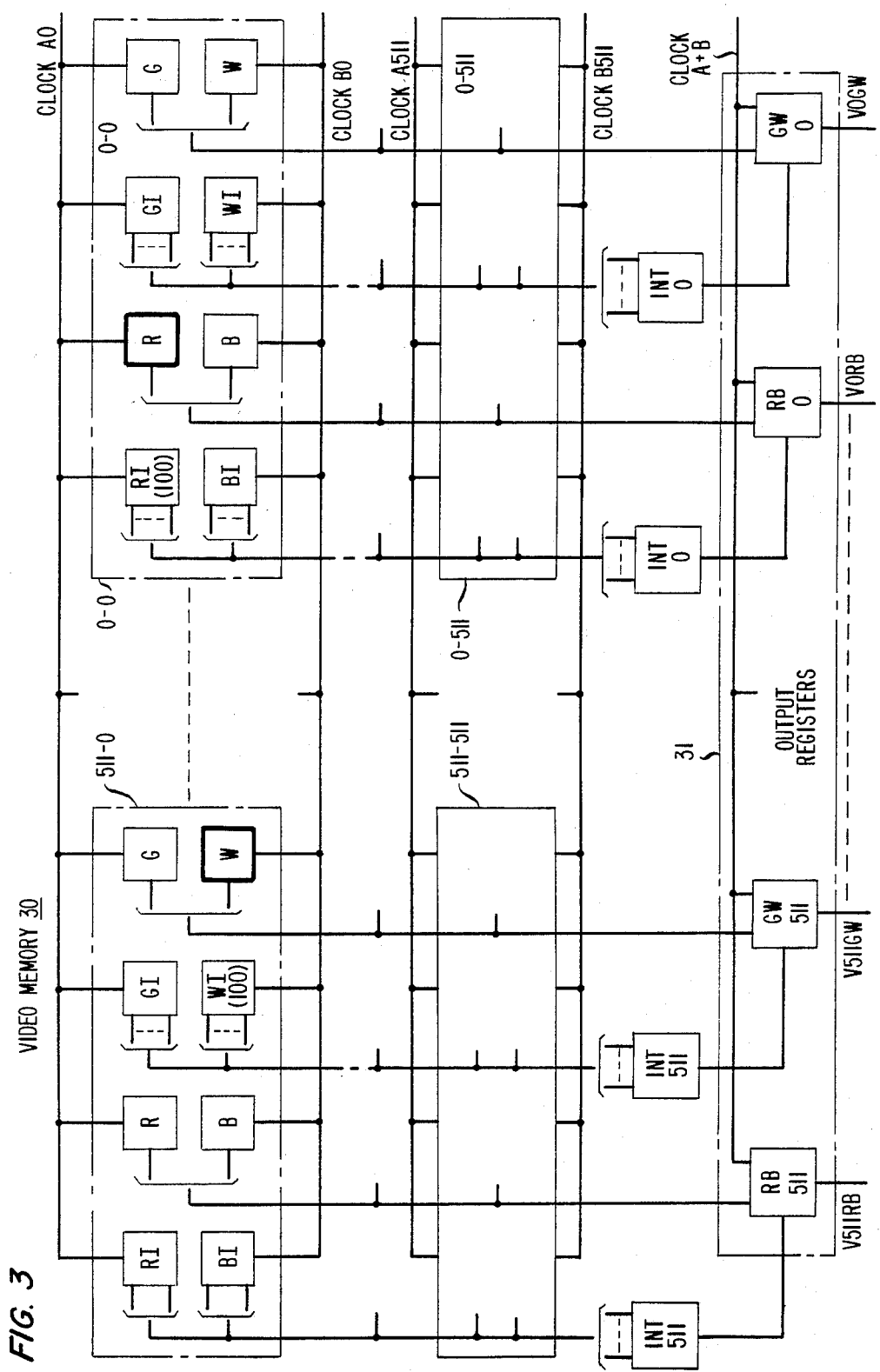
FIGS. 3 and 4 are schematics showing the video memory and clock control circuits.

For the purposes of this discussion, it will be assumed that each pel has associated in memory a location having the registers shown in FIG. 3 for each pel, namely, register G to control the green phosphor, register R to control the red phosphor, register W to control the white phosphor, and register B to control the blue phosphor. Associated with each register is an intensity register, such as intensity register GI shown in FIG. 3, to control the intensity of the green phosphor. It will be assumed that there is logic associated with the memory which will activate the white register when a combination of red, green, and blue signals are received at a pel.

Now assuming an instant of time in video memory 30, FIG. 3, corresponding to the desired colors shown in FIG. 5, then the memory associated with pel 00 would have an activated R register (shown in heavy lines), and the intensity of the red intensity register would have 100 on a relative scale. At the same time, the memory associated with pel 511-0 would have an activated W register with an intensity of 100 in the WI register. Of course, the R, B and G registers could also be active in pel 0-511 in addition to the W register, or without the W register, if the white phosphor were not to be used.

In a similar manner, all of the other registers of video memory 30 are loaded with the bit information corresponding to the chart of FIG. 5. Clock pulses A0 though B511, as shown in FIG. 6, are applied to memory 30, thereby, row by row, sequentially providing control signals to panel 100. Of course, there is no need to have a full video memory, and the system could be constructed using only buffer registers to hold the signal of a single row.

Figure 8:
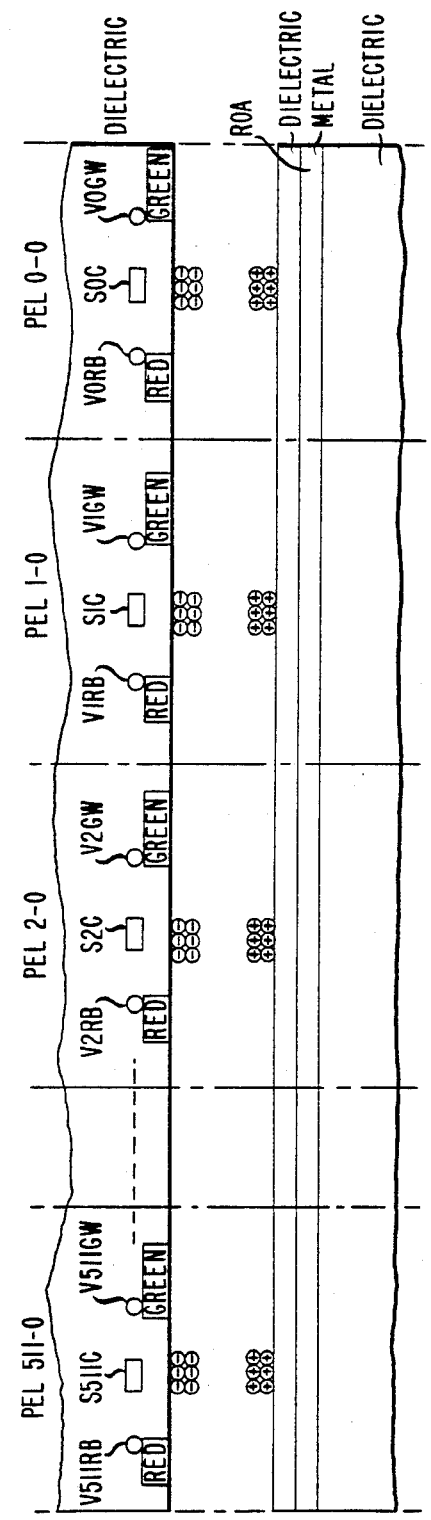
Figure 9:
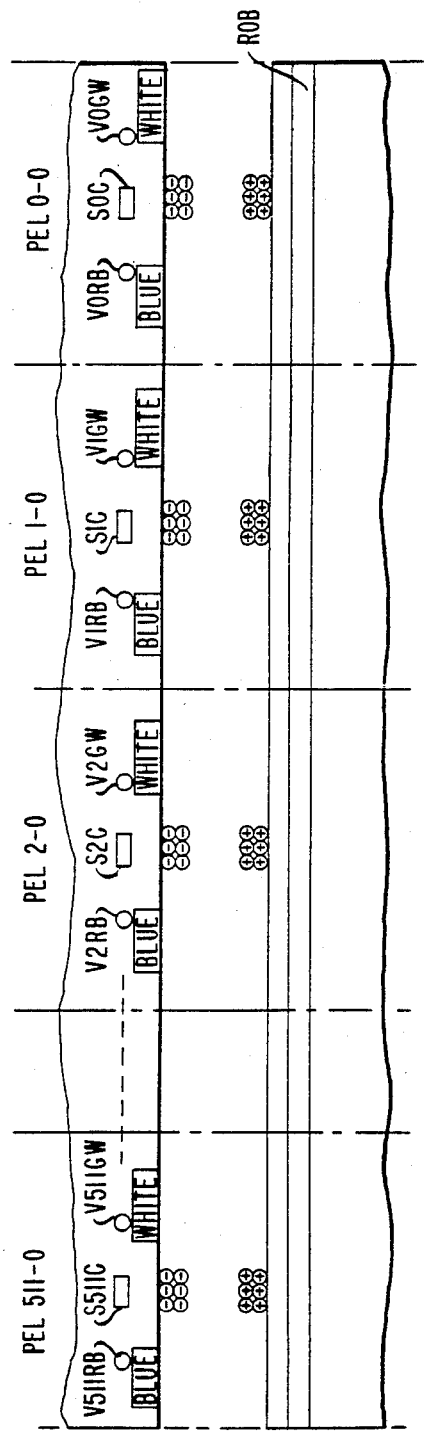

Digressing momentarily and turning to FIG. 8, a pictorial view of one crosspoint of panel 100 is shown in a cutaway section. From a time sequence this view is taken at the conclusion of a negative pulse on the R0A row electrode. It will be seen at this point that negative electrons are gathered around column electrodes S0C, S1C, S2C and S511C, while positive ions are collected opposite these positions. At the same point in time, the same situation occurs for all of the rows, as shown in FIG. 9 for row R0B.

Figure 11:
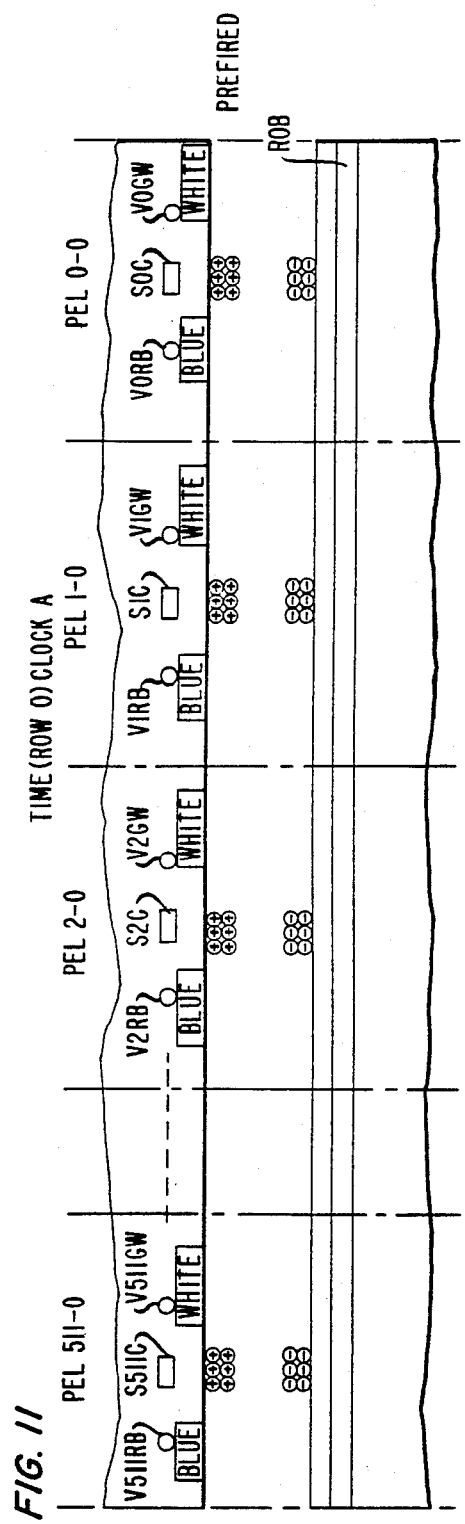

In FIG. 11, row R0B is again shown, this time at the conclusion of blocking signal BS1 shown in FIG. 6. The blocking voltage which occurs after the positive sustain voltage and before the negative sustain voltage causes the electrons and ions at each of the crosspoints to switch positions and thus positive ions are gathered around the column electrodes S0C through 511C. This blocking signal is applied to all rows, except the row in which the color signal is to be presented. The control for this is shown in FIG. 4.

Immediately subsequent to the blocking signal time slot, and just prior to the negative sustain signal, is applied to a high voltage driver (not shown) for application of a negative voltage pulse to the S-column conductors (FIGS. 2 and 10) causing the electrons, which had been gathered around each of the column electrodes S0C through S11C, to form a charge cloud.

Figure 4:
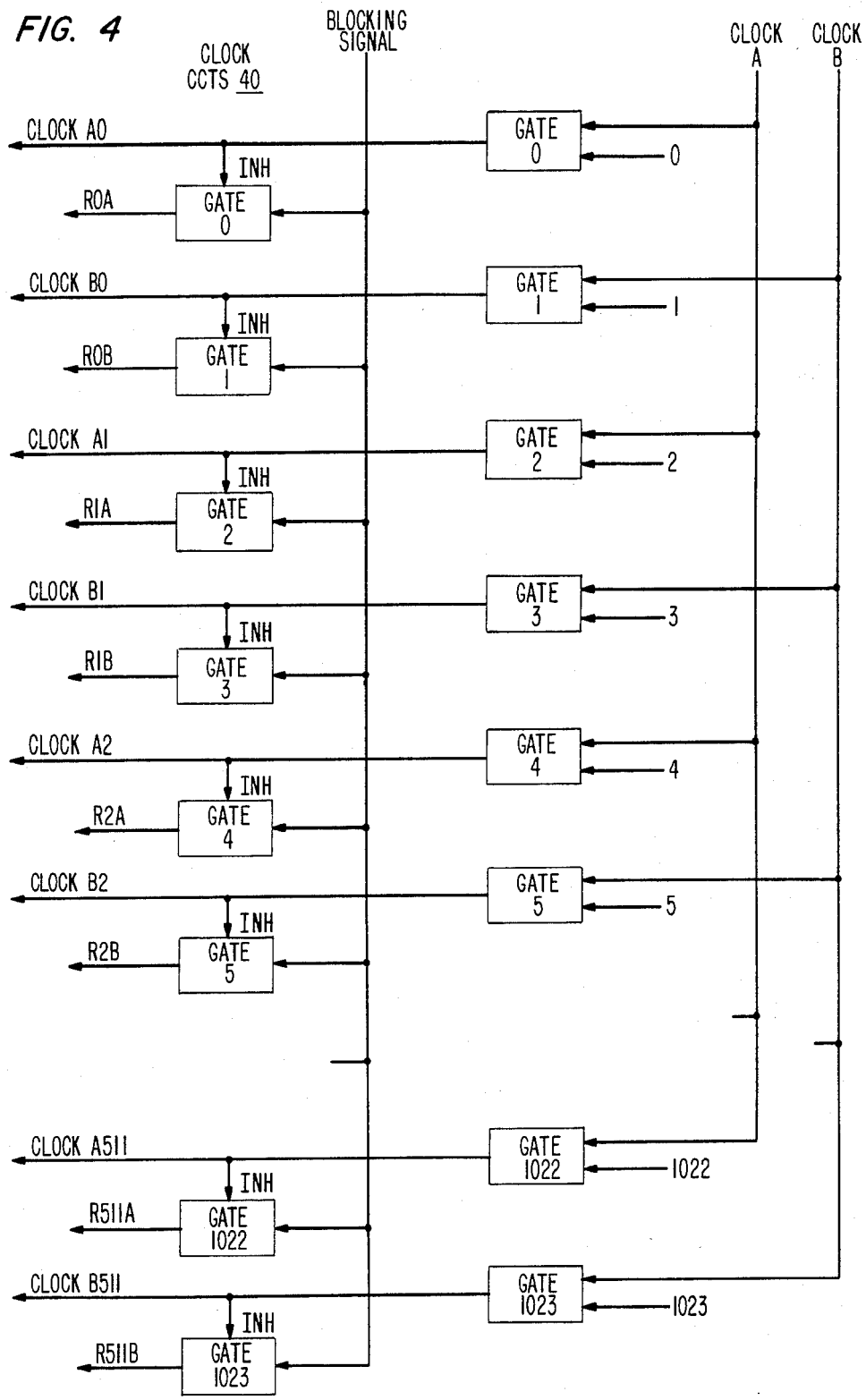

At the same time, clock signal A0, FIG. 4, is provided to video memory 30, thereby strobing the information contained in the first row of memory elements into output drivers 31. These output drivers now contain an indication of the desired color phosphor and the intensity of that phosphor for each pel. Clock pulse A+B strobes these drivers, which in turn provide positive voltage pulses on the dc migration conductors of panel 100. Thus, for pel 00, FIG. 2, this translates to a full strength (100 percent) voltage on conductor V0RB to FIG. 2.

Figure 10:
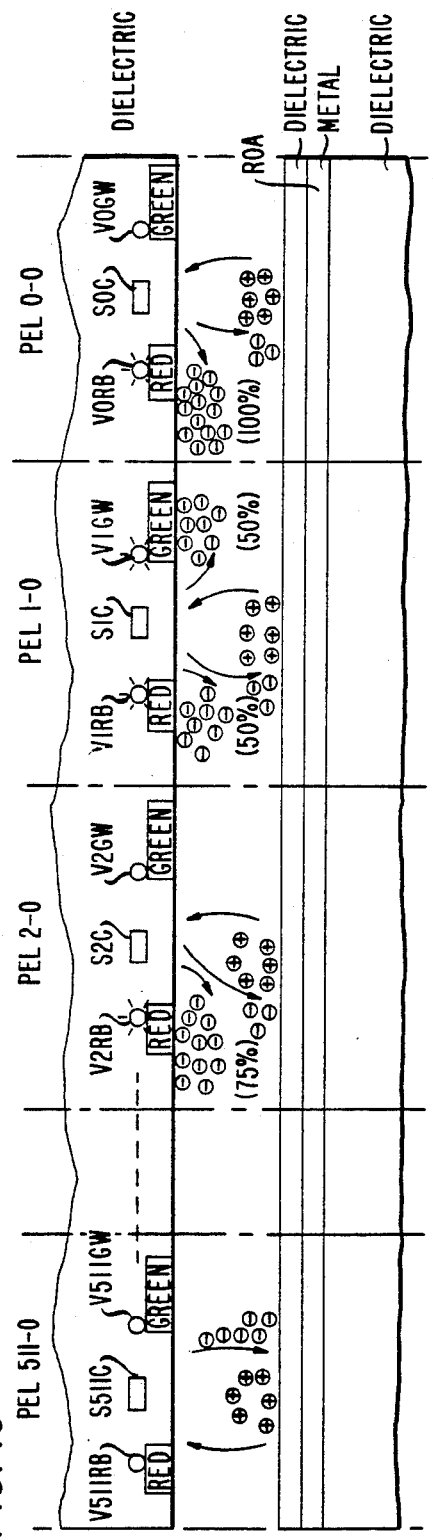

Turning to FIG. 10, the voltage applied on the V0RB conductor from the video memory causes the electron cloud generated at column conductor S0C to migrate toward the positive voltage on column V0RB. These electrons excite the red phosphor causing that phosphor to glow. These electrons also travel across the gas to the position priorly occupied by the positive ions.

From chart 5 we see that pel 1-0 is to be yellow, which, in TV processing, is a combination of red and green. Thus, as shown in FIG. 10, in a manner previously described, a voltage would appear, via video memory 30, on the V1RB and V1GW column conductors associated with discharge site S1C, and the electrons from that site would migrate past both the red and green phosphors causing those phosphors to give off light. The amount of light discharged is a function of the number of electrons passing the phosphor, which in turn is a function of the magnitude of the dc voltage on the column electrode.

Thus, for pel 2-0, the dc voltage would be 75 percent of maximum causing 75 percent of the maximum number of electrons to migrate past the red phosphor.

Since pel 511-0 is to have only its white phosphors turned on, no voltage is applied to column conductors V511RB and V511GW during clock phase A. Thus the electrons and ions simply change position without lateral migration.

The next cycle of the clock is positive and the electrons and ions again switch position, returning to the configuration shown in FIGS. 8 and 9.

Figure 12:
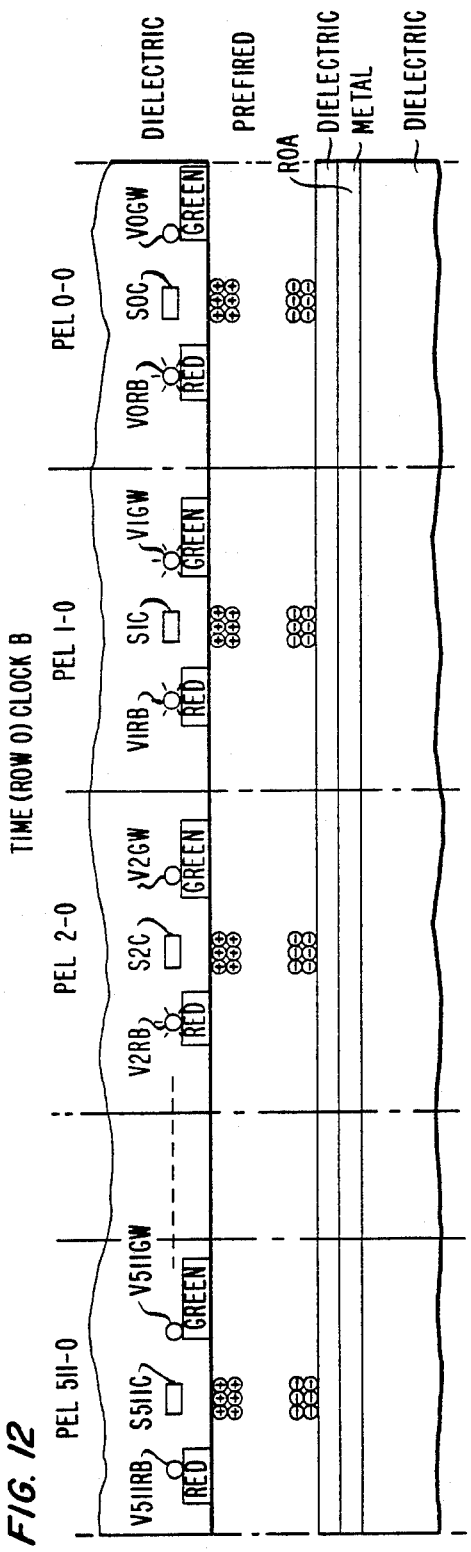
Figure 13:
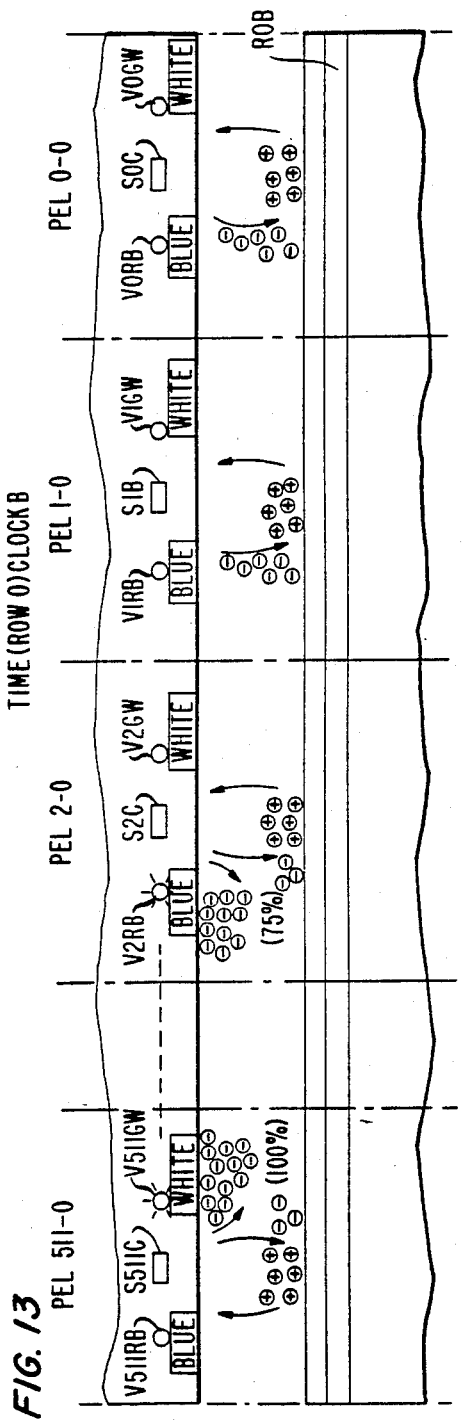

Then the next blocking pulse is applied to all rows, except row R0B. Thus, as shown in FIG. 12, row R0A is prefired. As shown, since the phosphors have a long decay time, those that were turned on during clock cycle A continue to glow.

Figure 7:
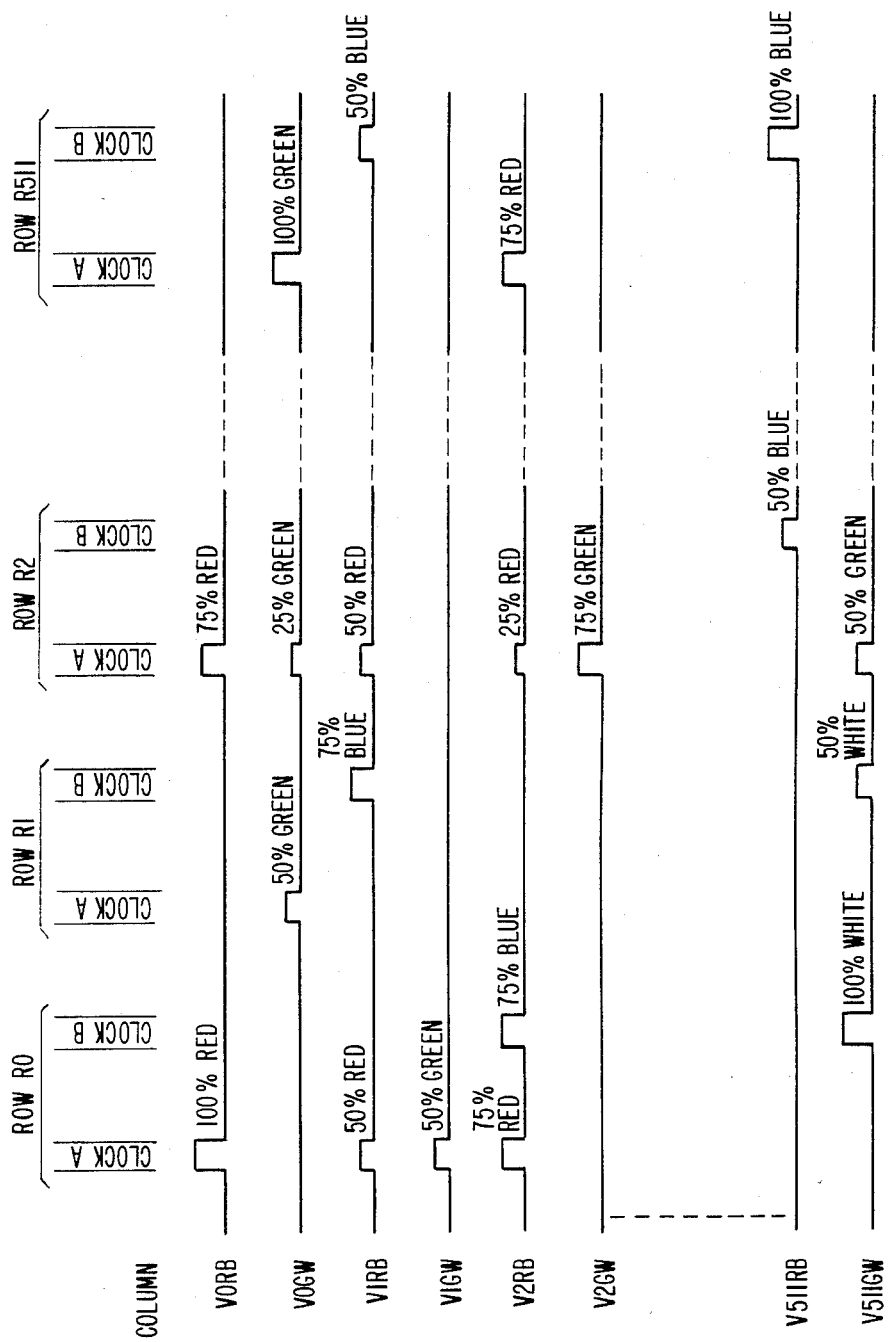

During clock cycle B, the blue phosphor of pel 2-0 is activated along with the white phosphor of pel 511-0. Thus, at the conclusion of the A and B cycles, pel 0-0 is showing red, pel 1-0 is showing yellow (red and green), pel 2-0 is showing magenta (red and blue), while pel 511-0 is showing white. The timing of the voltage pulses on the vertical control leads which establish these colors is shown in FIG. 7 under row 0. These signals are controlled from clock circuit 40, FIG. 4, and video memory 30, FIG. 3 in a straightforward manner.

During the A cycle of the next clock pulse, the colors for row 1, pel 0-1 through pel 511-1 will be turned on in accordance with the chart shown in FIG. 5. Thus, turning to FIG. 14, it will be seen that during the A cycle of row R1A, a pulse will be applied to conductor V0GW, causing the green phosphor of pel 0-1 to emit light. Since the magnitude of the voltage on conductor V0GW is 50 percent of an established maximum (which is the value stored in the appropriate register of video memory 30, FIG. 3), the green phosphor emits light at half intensity.

In pel 1-1, neither the red nor green phosphors are to be rendered active and thus no voltage potential is applied on conductor V1RB or V1GW, and the electrons from the charge cloud of the discharge site simply reverse position with the ions and are not migrated toward either of the adjacent phosphors. At pel 2-1 of row R1A, the same thing occurs with no phosphors coming active, as is also the case in pel 511-1.

Since the blocking pulse had been applied to all row other than row R1A just prior to the clock A pulse, the electrons of the charge cloud discharge sites are not available for migration in any row other than in row R1A. This is shown in FIG. 15 for row R1B.

Turning now to FIG. 16, after the next positive sustain pulse, the prefiring pulse is applied to all rows, including row R1A, thus causing a charge cloud discharge at the discharge sites at a time when no voltages are applied to the adjacent migration conductors. Thus, as shown in FIG. 16, only those phosphors which had priorly been turned on remain on.

When the clock B pulse occurs, as shown in FIG. 17, no voltage potential is applied to the migration conductors of pel 0-1 and thus no electron migration occurs at the pel at this time.

A potential of 75 percent of full value is applied to conductor V1RB of pel 1-1, causing electron migration from discharge site S1C to vertical conductor V1RB, thereby causing the blue phosphor to emit light at 75 percent of full value. With respect to pel 2-1, no voltage potentials are applied to the migration conductor leads and thus no migration occurs. At pel 511-1, a voltage potential of 50 percent of full value is applied to conductor V511GW, causing the white phosphor to emit light at 50 percent of value.

In review, with respect to row 1, pel 0-1 shows 50 percent green (row R1A), pel 1-1 shows 75 percent blue (row R1B), pel 2-1 shows black since no phosphors are lighted, and pel 511-1 shows 50 percent white (row R1B). These colors are in accordance with the row 1 color chart shown in FIG. 5.

Gray Tone Control

The foregoing discussion is directed to color presentation on an ac plasma panel. By substituting for the color phosphors white phosphor spaced in relationship to each discharge site, it is possible to establish electric fields from the discharge site to the phosphor site in the same manner discussed such that the signal strength applied to the conductor at each phosphor site controls the intensity of light displayed to a viewer. In this manner, it is possible, on a row-by-row basis, to control precisely the gray tone distribution of light on a plasma panel.

Alternate Embodiment

Figures 18, 19:
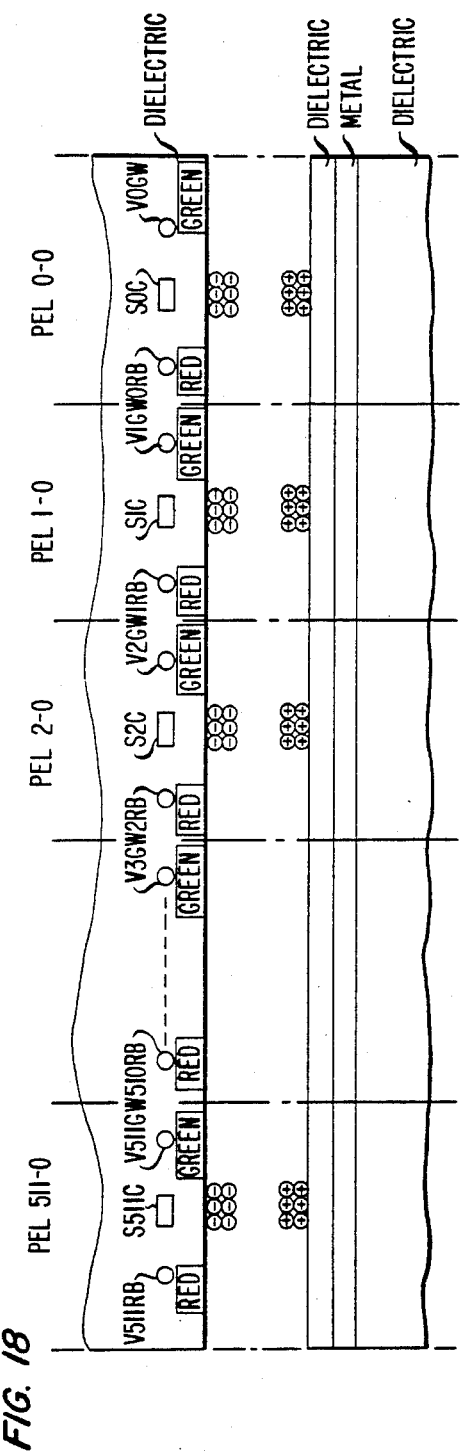
FIGS. 18 and 19 depict alternate embodiment cross-sectioned representations.

FIGS. 18 and 19 show an alternate arrangement of the ac plasma panel where the phosphors of the adjacent pels share a common vertical electrode for the purpose of controlling electron migration. Thus, as shown in FIG. 18, display site S0C has associated with it red phosphor controlled by a voltage potential on lead V1GW0RB while display site S1C has associated with it a green phosphor controlled by the same vertical conductor. In this embodiment, in order to control the displayed colors, it is necessary to refresh each discharge site on alternate clock cycles such that when the negative-going sustain pulse is applied to conductors S0C, S2C, etc., a positive sustain pulse is applied to controls S1C, S3C, etc. Full selectivity is thereby assured.

Conclusion

While two rows are shown for each pel, each row having a separate display site, it is certainly possible to arrange the plasma panel in a manner to have one display site surrounded by colored phosphors by implementing the proper vertical and horizontal conductors, and one skilled in the art may arrange these phosphors in any desirable manner to provide the necessary resolution.

It should be noted that it could be possible to draw so many electrons away from the discharge sites to make it necessary to rewrite, in the conventional manner, those sites. This may be done periodically, even if sites are not distinguished. Also, it should be noted that for a single substrate ac plasma panel where a field gradient could be generated between sites, this technique can also be applied.

What is claimed is:

1. A plasma panel having a plurality of discharge sites, each site having opposing dielectric surfaces and each site operable for ionizing the plasma gas at a particular panel location between said surfaces, said ionization including the periodic generation of an electron charge cloud, characterized in that said panel also includes at least two migration sites associated with each said discharge site, each said migration site located along the same surface as said associated discharge site and each said migration site including means for independently and selectively attracting electrons from said associated discharge site during said electron charge cloud generation interval, each said migration site further including means responsive to the direct impingement of said attracted electrons thereupon for emitting light rays under control of said selectively attracted electrons, and means for removing said impinged electrons from said migration site.

2. The invention set forth in claim 1 wherein the intensity of said emitted light rays is controllable by said selective attracting means.

3. A gas discharge panel having a plurality of discharge locations for ionizing the gas of said panel at sites thereon each said site bounded by dielectric substrates and wherein electrons generated at each said ionization move across the region bounded by said substrates, said discharge sites having associated therewith at least one light emitting site disposed laterally along a single substrate, each said light emitting site operable for providing to a viewer light rays when impacted by electrons generated at said associated discharge site, and each said discharge site having associated therewith means for independently and selectively establishing an electric field potential between said discharge site and said adjacent light emitting site, said electric field potential causing the migration of available electrons from said discharge site to said associated laterally displaced light emitting sites, whereby said electrons directly impact said light emitting site.

4. The invention set forth in claim 3 wherein each said light emitting site includes phosphor which provides a distinct color when impacted by said electrons, and wherein said selective establishing means includes at least one electrical conductor placed in proximity to said plasma gas and to individual phosphor sites so as to remove said electrons which impact said phosphor site from the region between said substrates.

5. The invention set forth in claim 4 wherein said electrical conductors are arranged in matrix fashion with each conductor controlling electron migration to more than one individual phosphor site.

6. An ac plasma panel having an envelope within which there is contained an ionizable gas, a plurality of row conductors spaced apart along one surface of said envelope, a plurality of column conductors orthogonal thereto spaced apart along an opposing surface of said envelope, said row and column conductors forming a matrix of sites for the ionization of the gas between said electrodes at said sites, discharge areas disposed along one surface of said envelope, said discharge areas adapted to emit light rays when struck by electrons, at least two control conductors spaced apart along said surface containing said discharge areas, said control conductors adapted for receiving electrical signals having a controllable magnitude and for creating, with respect to either a row or column conductor, an electric field for causing the migration of electrons from said ionization sites to selected discharge areas during said ionization of said gas in accordance with the intensity of the electric field created at any given time.

7. The invention set forth in claim 6 wherein each said discharge area includes at least one phosphor area associated with a viewing surface of said envelope, said phosphor area being within at least one of said created electric fields.

8. A color ac plasma system, said system including an ac plasma panel having an envelope within which there is contained an ionizable gas, a plurality of row conductors spaced apart along one surface of said envelope, a plurality of column conductors orthogonal thereto spaced apart along an opposing surface of said envelope said row and column conductors forming a matrix of sites for the ionization of the gas between said electrodes at said sites, phosphor discharge areas disposed along one surface of said envelope, said discharge areas adapted to emit light rays when struck by electrons, and control conductors spaced apart along said surface containing said phosphor discharge areas, said control conductors adapted for receiving electrical signals having a controllable magnitude and for creating, with respect to either a row or column conductor, an electric field for causing the migration of electrons from said ionization sites to selected phosphor discharge areas during said ionization of said gas in accordance with the intensity of the electric field created at any given time.

9. The invention set forth in claim 8 further comprising means for selectively controlling said electron migration one row at a time.

10. The invention set forth in claim 8 wherein said selective controlling means includes means for preionizing said gas at those sites where electron migration is not desired.

* * * * *